Jan. 16, 1934. W. W. SMITH 1,943,933
METHOD OF MAKING PILING SECTIONS OF GENERAL Z-SHAPE
Filed April 26, 1932 6 Sheets-Sheet 1
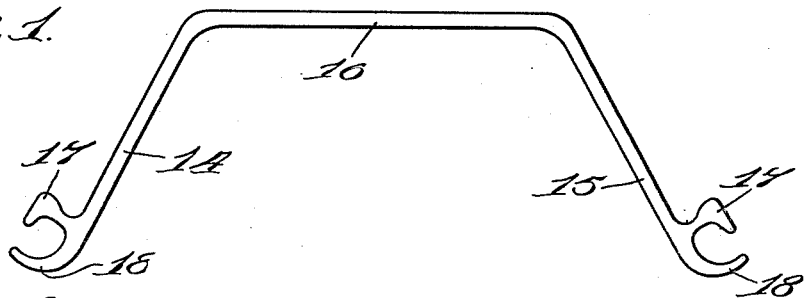
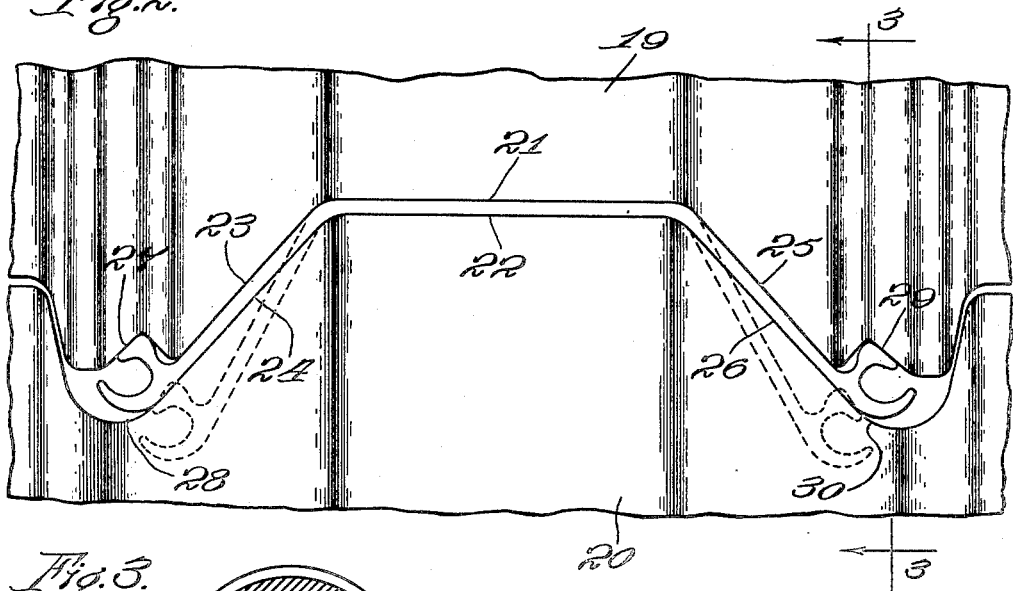
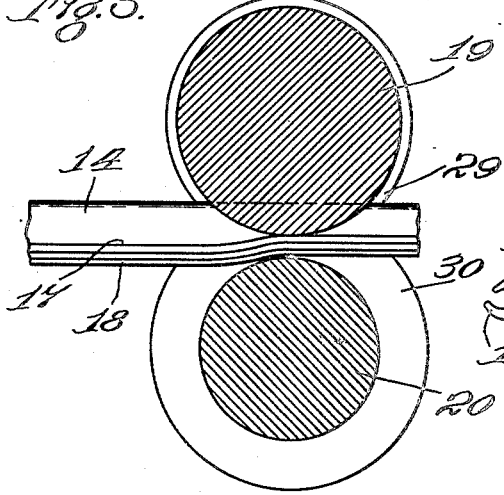
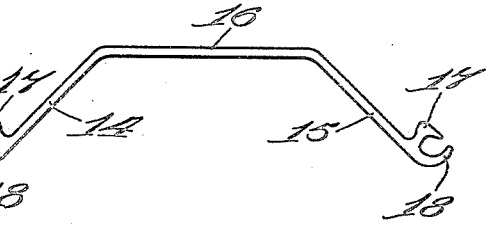
Inventor:
Wallace W. Smith.

Jan. 16, 1934. W. W. SMITH 1,943,933
METHOD OF MAKING PILING SECTIONS OF GENERAL Z-SHAPE
Filed April 26, 1932 6 Sheets-Sheet 2
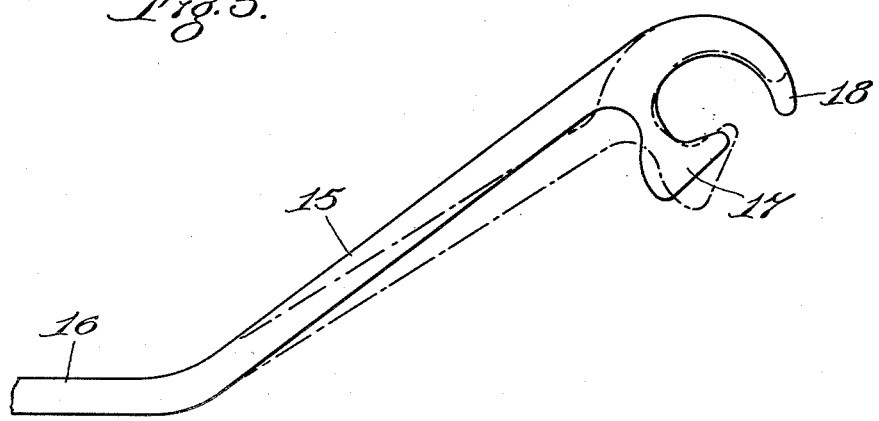
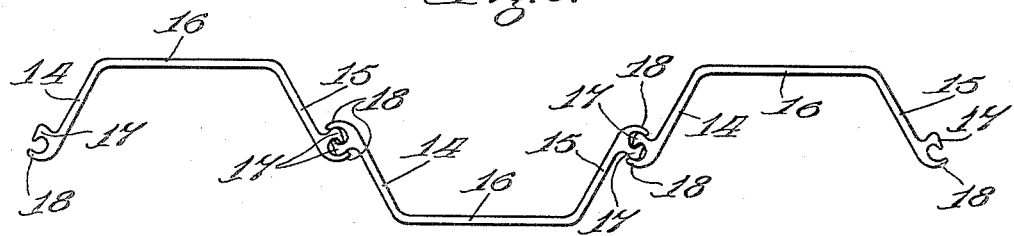
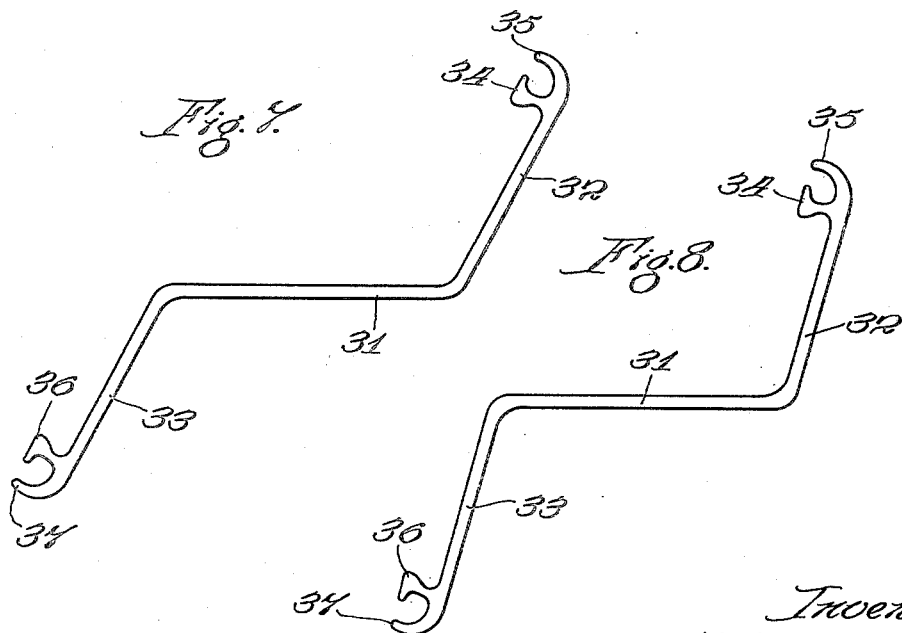

Jan. 16, 1934. W. W. SMITH 1,943,933
METHOD OF MAKING PILING SECTIONS OF GENERAL Z-SHAPE
Filed April 26, 1932 6 Sheets-Sheet 3

Inventor:
Wallace W. Smith.
By Dyrenforth, Lee, Chritton & Wiles
Attys.

Jan. 16, 1934.     W. W. SMITH     1,943,933
METHOD OF MAKING PILING SECTIONS OF GENERAL Z-SHAPE
Filed April 26, 1932     6 Sheets-Sheet 4
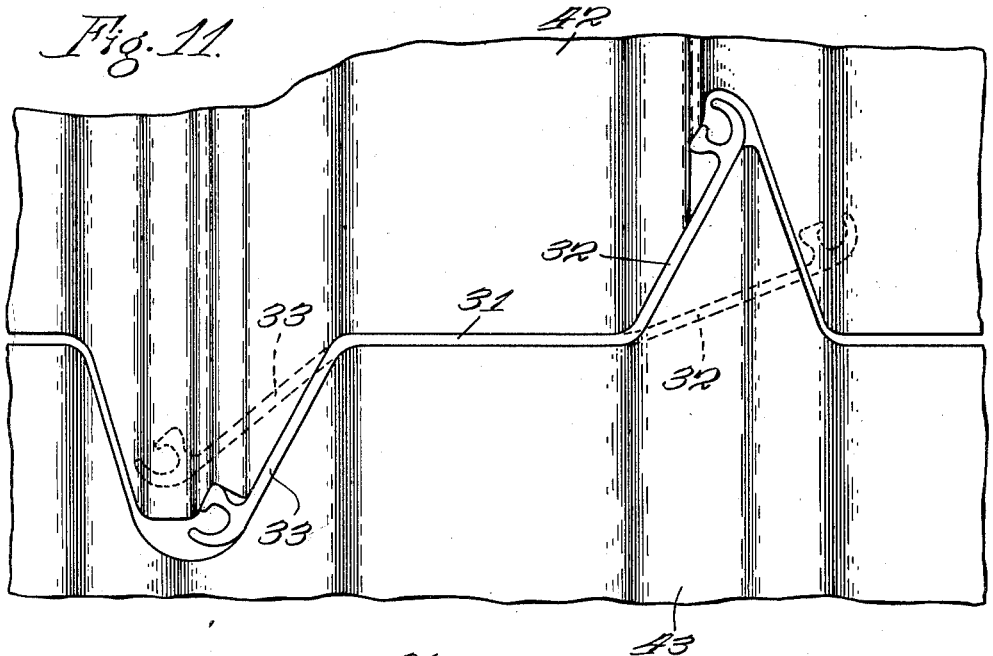
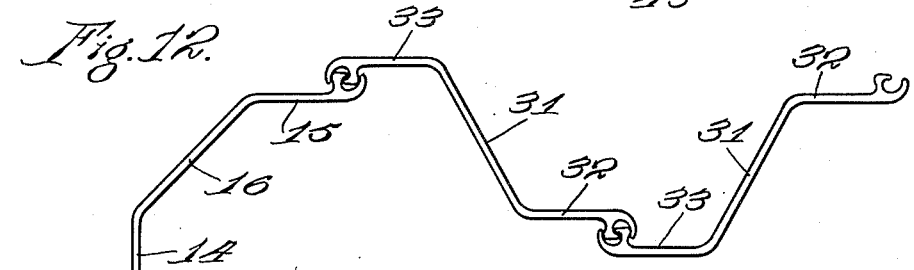
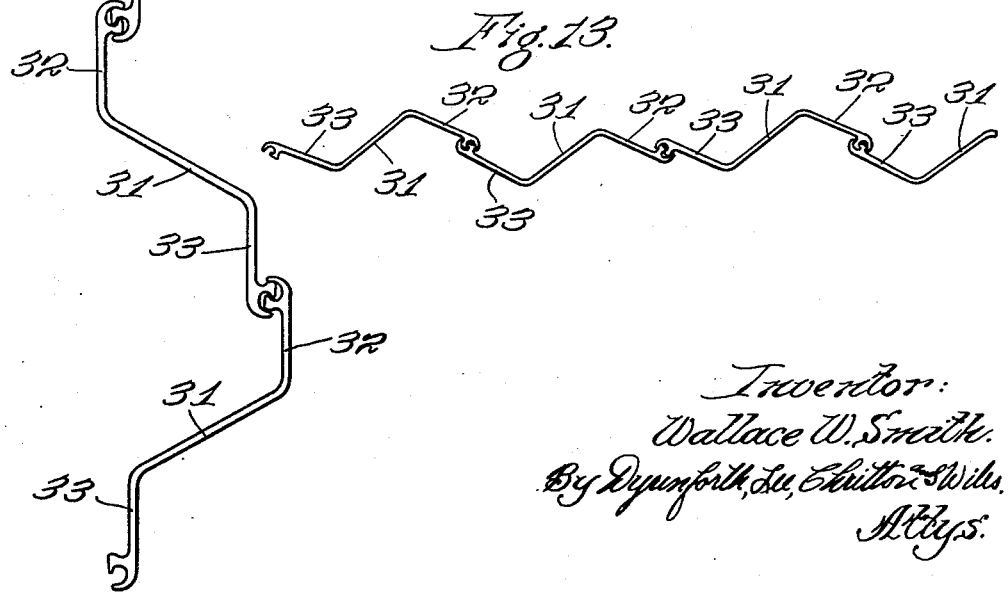

Jan. 16, 1934.   W. W. SMITH   1,943,933
METHOD OF MAKING PILING SECTIONS OF GENERAL Z-SHAPE
Filed April 26, 1932   6 Sheets-Sheet 5
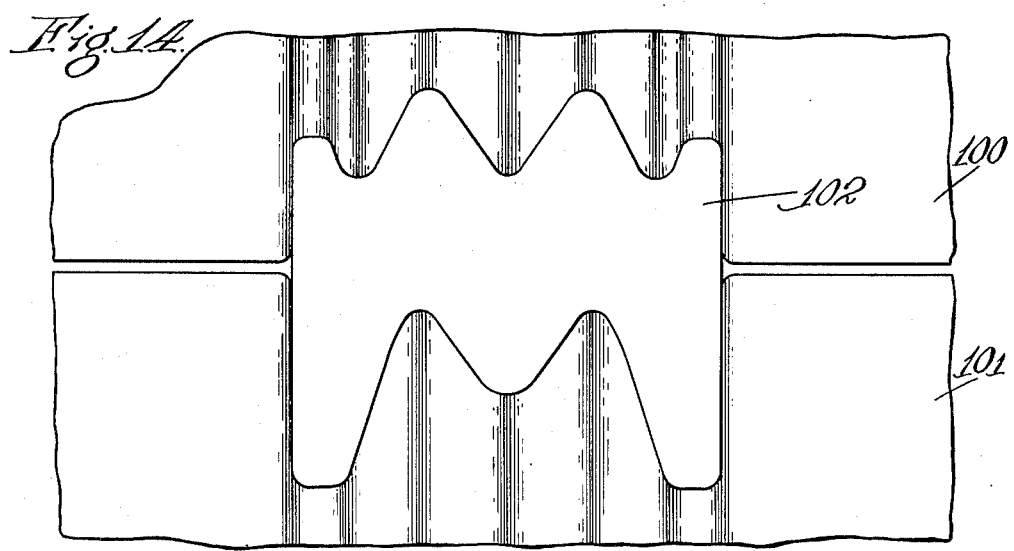
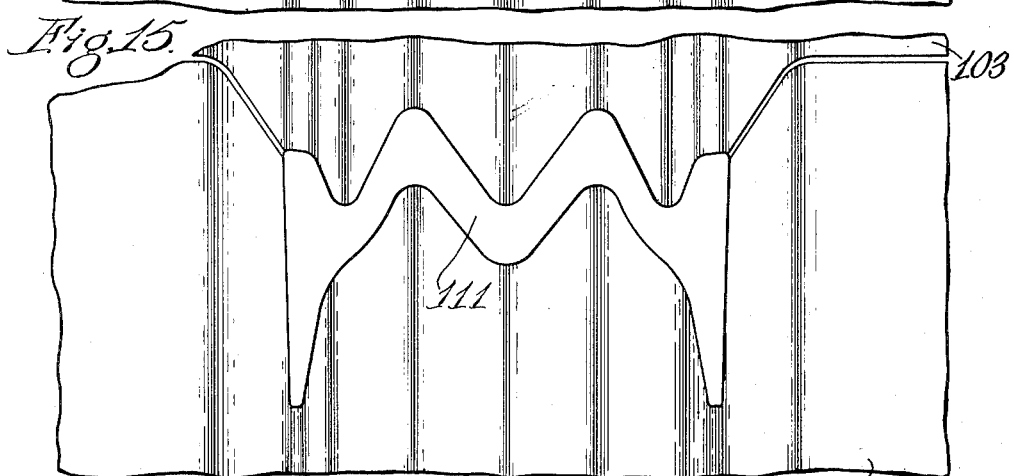
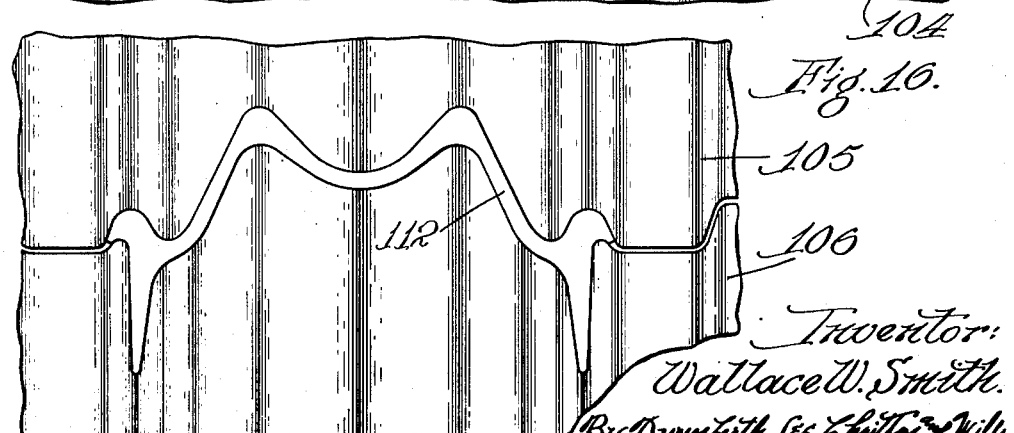

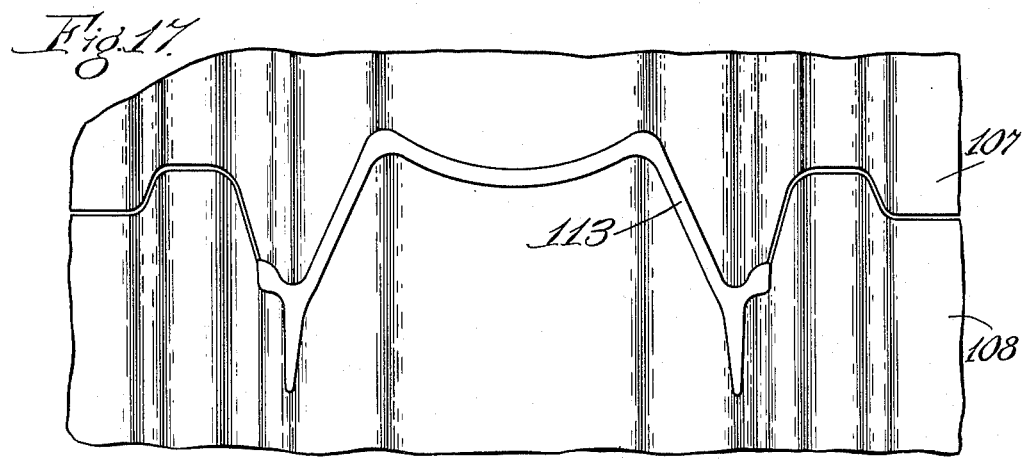
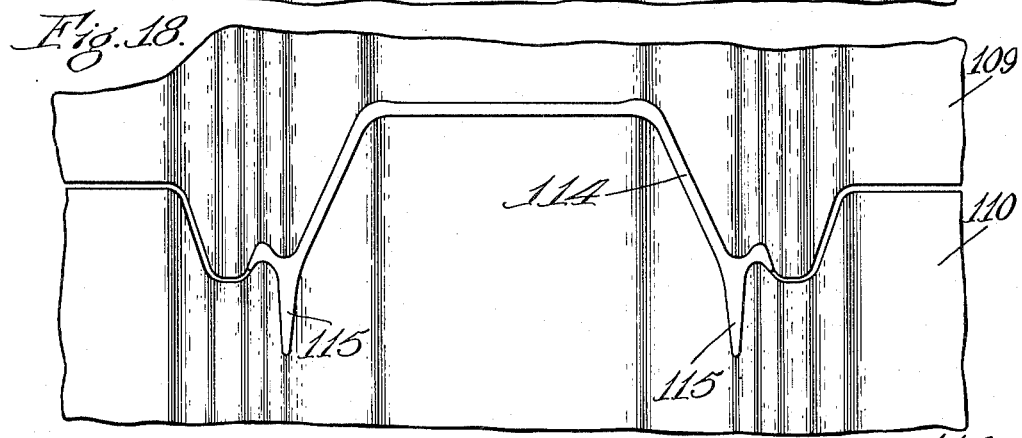
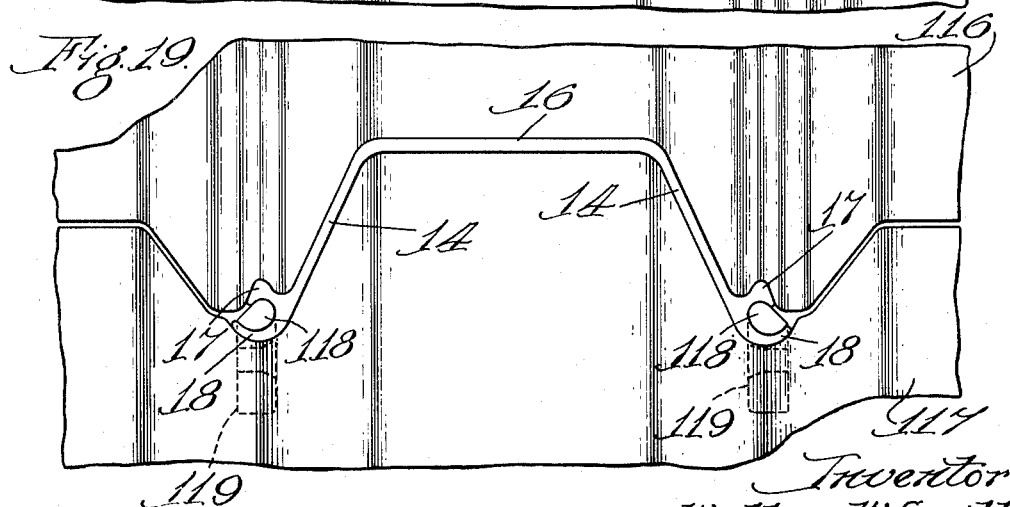

Patented Jan. 16, 1934

1,943,933

UNITED STATES PATENT OFFICE 1,943,933

METHOD OF MAKING PILING SECTIONS OF GENERAL Z-SHAPE

Wallace W. Smith, Chicago, Ill., assignor to Inland Steel Company, Chicago, Ill., a corporation of Delaware Application April 26, 1932. Serial No. 607,639

2 Claims. (Cl. 29—155)

My invention relates to the manufacture of rolled piling sections of a cross section other than plano, as for example of channel form, or of general Z-shape, with portions at their opposite longitudinal edges, and formed in the rolling operation, adapting adjacent piling sections to be interlocked along such edges to form a piling structure.

As a preface to the following statement of my object it may be stated that any given size of rolling mill for the production of piling sections having rolled edge-interlocks, presents limitations as to the widths of sections which may be produced thereon. Furthermore, in the production of interlocks of the thumb and finger type and which is recognized as a very desirable form of interlock, it is impossible to roll such interlocks and still provide the piling section of the proper shape and with the metal distributed to the best advantage, except in those cases where the angle at which the flange portions of the section extend relative to the web portion, is relatively steep.

One of my objects is to reduce the cost of manufacturing different shapes of piling sections, particularly of the channel type.

Another object is to reduce the cost of the equipment necessary to roll piling sections of different shapes.

Another object is to produce a wider piling section than possible on rolling mills now in use in steel mills and of any desired depth within the range of depths as may be desired for piling sections.

Another object is to provide for such disposition of the metal in piling sections of the wider shallower shapes and having interlocks of the thumb and finger type above referred to, that the piling sections will be rendered stronger than sections of equivalent weight per square foot and made in accordance with previous practices.

Another object is to provide a piling section of general Z-shape in cross section which may be used either in providing a piling structure wherein the interlocks between adjacent sections extend in alternation substantially coincident with the front and rear surfaces, respectively, of the piling structure, or in a line intermediate these surfaces, in the latter case the piling structure produced being of corrugated form, or, if desired, assembled with a piling section of channel form at the adjacent ends of wall portions, formed of the Z-sections, disposed at a right angle to each other, to form a right angle corner; and other objects as will be manifest from the following description.

Referring to the accompanying drawings:

Figure 1 is an end view of a piling section of channel form of the thumb and finger interlock type and commonly in use.

Figure 2 is a broken view in elevation of forming or bending apparatus which may be used in practicing my new method.

Figure 3 is a section taken at the irregular line 3—3 on Fig. 2 and viewed in the direction of the arrows.

Figure 4 is an end view of a piling section of still shallower form and which may be produced in accordance with my invention.

Figure 5 is an end view of one of the similar flange portions or, side walls, and a portion of the web of a channel piling section of the type above referred to and produced by the invention, and showing by dot and dash lines a comparative structure.

Figure 6 is a plan view of a piling structure formed of piling sections of the channel, thumb and finger interlock, type, illustrating the common way of assembling such sections to form the structure.

Figures 7 and 8 are end views of piling sections of general Z-shape in accordance with one of the phases of my invention and produced by my improved method.

Figure 11 is a similar view showing the third set of rolls through which the piling section deformed by the rolls of Figs. 9 and 10 would be passed.

Figure 9:
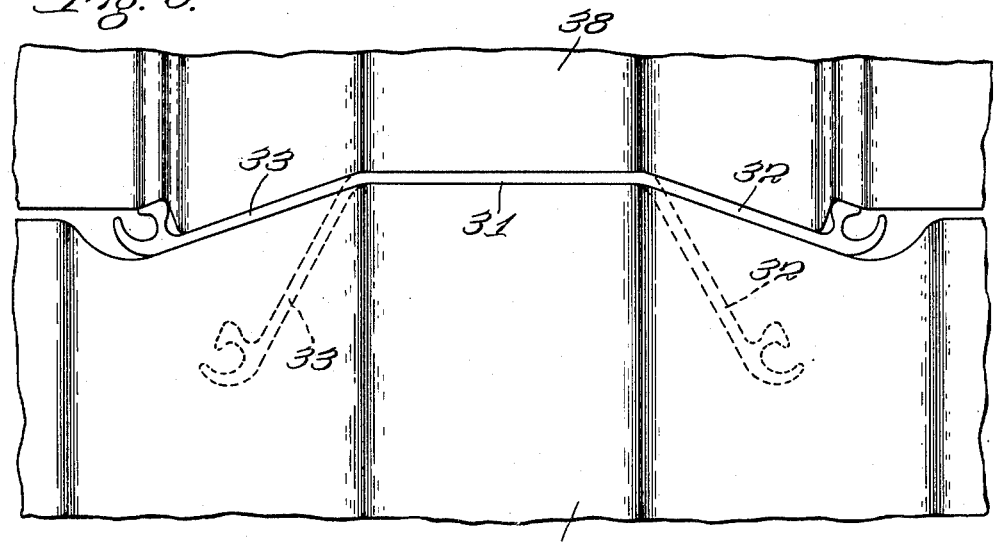
Figure 9 is a broken view in elevation of bending or forming apparatus suitable for practicing my improved method in the bending of a completed interlock-equipped piling section, into general Z-shape, this view illustrating the first set of rolls through which the channel piling section would be passed.

Figures 12 and 13 are plan views of other arrangements of sheet piling sections provided by the invention; and Figures 14 to 19, inclusive, broken views in elevation of certain of the pairs of rolls constituting rolling mechanism, provided in accordance with common practice, for producing the sheet piling section shown in Fig. 1, the rolls shown in Fig. 14 comprising those which constitute the first pass of the rolling mechanism; those shown in Fig. 19 constituting the final pass and those shown in Figs. 15–18 the rolls constituting certain of the intermediate passes.

All of the above figures except Fig. 5 are on a reduced scale as compared with Figs. 1 and 2, Fig. 5 being on an enlarged scale relative to Figs. 1 and 2.

Referring to the utilizing of my invention in the making of piling sections of the type comprising interlocks of the thumb and finger type, it is contemplated that the piling sections to be produced in accordance with my improved method, be rolled, in accordance with common practice, into finished form in the rolling mill as for example into the form shown in Fig. 1, and which may represent one of the shapes of piling sections as provided for use, the angle of divergence of the flange portions, or side walls, of the piling section and represented at 14 and 15, and their disposition relative to the web portion 16 being such that the thumb and finger portions 17 and 18 at the outer edges of these side walls and which form the interlocks for adjacent piling sections, may be produced in their final form by the rolling operation; and thereafter the rolled section subjected to a forming or bending operation to bend the side walls of the sections at their juncture with the web portions thereof to produce wider and shallower piling sections as desired, as for example as shown of the channel section by full lines in Fig. 2, or as shown, but on a reduced scale, in Fig. 4, or to produce general Z-shaped sections, as for example as shown in Figs. 7 and 8.

Thus the channel piling sections of deeper and narrower shapes may be produced by the rolling process as commonly practiced, and piling sections of the wider and shallower shapes and the general Z-shaped sections produced merely by deforming rolled piling sections of one of the shapes produced by the rolling method; or, if desired, all of the piling sections produced by the rolling method may be of one shape, as for example relatively deep and narrower, and all of the other shapes of channel sections desired, and the general Z-shaped sections, produced by the bending or forming of such finished rolled shape.

The piling section of Fig. 1 is formed, in accordance with common practice, from a billet commonly of rectangular shape in cross section, by passing the latter through a series of pairs of rolls which operate thereon in succession to roll the billet to the form shown in Fig. 1. The common practice is to provide a large number of these pairs of rolls each of which forms a pass to produce a more or less gradual shaping of the billet into the final form shown in Fig. 1. However, for purposes of illustration it is deemed sufficient to show the rolls constituting the first, last, and some only of the intermediate passes.

The first pass comprises rollers 100 and 101, shown in Fig. 14, the peripheries of which are so grooved as shown as to roll the metal body, provided as a billet, and from which the piling section is to be formed into a form of a cross section substantially that illustrated in this figure and represented at 102.

The next four passes of those illustrated and shown in Figs. 15–18, inclusive comprise pairs of rolls 103 and 104, 105 and 106, 107 and 108, and 109 and 110, respectively, which are so peripherally grooved as shown as to roll the metal body, in the passing thereof through these passes, in succession, into substantially the cross-sectional forms illustrated in these figures and represented at 111, 112, 113 and 114, respectively.

Further referring to Fig. 18 which shows the rolls of the next to the last pass, it will be noted that the metal body upon passing through the set of rolls of this figure is formed into a shape closely approximately the final shape of the piling section shown in Fig. 1, except for the finger portions 18 thereof and which in the last pass shown in Fig. 19 are formed by outwardly bending the flange portions represented at 115 in Fig. 18.

The last pass comprises the rolls 116 and 117 shown in Fig. 19 and which are so peripherally grooved as shown as to roll the metal body into the shape shown in this figure and in Fig. 1, in which operation the flanges 115 are outwardly bent into curved form around mandrels 118 which, in accordance with common practice, are stationarily supported at shanks 119, to produce the fingers 18.

Referring to the forming or bending operation above referred to, this may be easily and economically effected and by a simple and relatively inexpensive apparatus involving opposed driven rolls arranged to receive, and operate on, the rolled shape, the peripheries of the rolls containing grooves so shaped as preferably to bend the side walls 14 and 15 of the piling section substantially at their juncture with the longitudinal edges of the web 16 to cause them to present the desired degree of divergence, or in the case of the forming of the general Z-shaped sections to extend in opposite directions from the longitudinal edges of the web and at the desired angle relative thereto, it being preferred that the roll apparatus be located in close proximity to the rolling mill so that the rolled shape may enter the roll apparatus from the rolling mill while still hot, as thereby the bending of the rolled shape to the desired form, is facilitated.

Figs. 2 and 3 illustrate rolls 19 and 20 for forming, from channel sections such as that shown in Fig. 1 and in dotted lines in Fig. 2 channel sections as shown by full lines in Fig. 2 shallower and wider than the rolled section from which they are to be formed and which may be driven in any suitable way.

The web portion 16 of the piling section in the feeding of the latter to the rolls extends between the circular surfaces 21 and 22 of the rolls and in such feeding the opposing inclined peripheral surfaces 23 and 24, and 25 and 26 of the rolls and which are divergent to the degree to which the side walls 14 and 15 are to extend, engage the side walls 14 and 15 of the piling section and bend them outwardly to the desired angular position, the thumb and finger locking elements 17 and 18 entering the spaces between the peripheral portions 27 and 28, and 29 and 30 of the rolls, these last-referred-to portions being so shaped as not to disturb the shape given in the rolling operation to these locking elements nor their relationship to the walls 14 and 15.

Fig. 4 represents, by way of example, and on a reduced scale, another shape of piling section which may be produced by the deforming action of roll apparatus as just described but with the contour of the rolls so modified as to produce a greater divergence of the flange portions 15 and 16 than in the case of the section shown by full lines in Fig. 2, the same reference numerals being given to the several parts thereof as in the case of the piling sections shown in Figs. 1 and 2, the section of Fig. 4 being rolled either by deforming the section directly from the shape shown in Fig. 1, or by first deforming the section to the shape shown by full lines in Fig. 2 and thereafter further deforming it to the shape shown in Fig. 4.

As will be readily understood the roll apparatus for forming or bending the flange portions, or side walls, of the piling section of Fig. 1 into a different position, as for example into the positions shown by the full lines in Fig. 2 or in Fig. 4 is relatively inexpensive as compared with rolls which are so shaped as to produce, by a series of rolling operations, the thumb and finger portions of the interlocks.

Furthermore, in the manufacture of relatively shallow sections and in fact any shape of piling section wherein a flange portion, or side wall, of the section extends at a relatively great oblique angle to the web portion of the section, and thumb and finger locking elements as above described and shown in the drawings are provided, limitations are encountered in that such locking elements cannot be produced in the rolling of the section if the angle referred to exceeds a predetermined degree and which is less than the angle at which the flange portions extend in the finished shallow section, unless such flange portions are provided of such shape that the metal forming the sections is so distributed as not to provide the maximum of strength for the amount of metal used.

The conditions just referred to are illustrated, by way of example, in Fig. 5 wherein the full lines represent, on an enlarged scale, a portion of the web 16 and one of the similar diverging flange portions designated at 15 of a piling section of relatively great width and relatively shallow as produced in accordance with my invention, namely, by deforming the piling section, such as that shown in Fig. 1, to cause the diverging flange portions to present the desired degree of divergence without deforming the locking portions of the section; and wherein the dot and dash lines represent the shape and position into which the flange portions would be required to be rolled and the position which the locking portions thereon would be required to assume were the locking portions formed in the finishing passes in the rolling of the piling section to a relatively shallow and wide shape, as for example as shown in Fig. 5.

From the showing in Fig. 5 it is obvious that the metal forming the diverging flange portions of the piling section and the locking portions thereof in the case of the piling section shown in full lines in Fig. 5, is so distributed as to afford greater strength, than in the case of a piling section the divergent flanges of which are rolled into the shape shown by dot and dash lines of the flange portion illustrated in this figure.

By forming the sections in accordance with my invention as above described, the section may be provided of greatly varying depths and widths and with the metal forming the locking elements and the flange portions so distributed as to produce the most desirable distribution of metal, as the locking elements are rolled with the flange portions extending at such an angle that the metal in these portions is properly distributed as in the case of relatively deep and narrow piling sections as commonly rolled and as shown in Fig. 1, and the desired degree of shallowness and width of section is produced by bending the section without deforming the locking elements or changing their relationship to the flanges on which they are provided.

In utilizing my new method for producing, in accordance with the preferred manner of practicing it, piling sections of general Z-shape in cross section as shown in Figs. 7 and 8, (on a reduced scale as compared with Figs. 1 and 2) wherein the web section is indicated at 31, the oppositely extending flange portions at 32 and 33 and the thumb and finger locking portions at 34, 35, 36 and 37, the sections of these two figures being the same except for the angle at which the flange portions 32 and 33 extend relative to the web 31, the flange portions of the sections rolled to channel shape with the locking portions formed therein as in Fig. 1, are subjected to progressive bending actions for bending these flange portions at their junctures with the webs into a condition in which they extend at the desired angle to the webs and in opposite directions therefrom as in Figs. 7 and 8.

Figure 10:
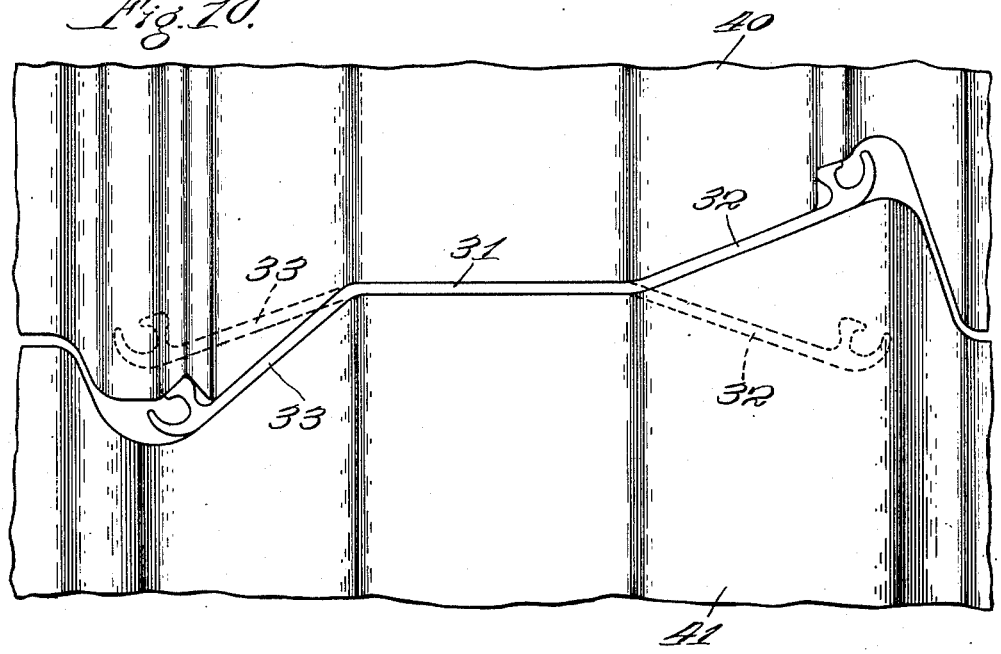
Figure 10 is a similar view showing the second series of rolls through which the partially deformed piling section would be passed.

I have illustrated in Figs. 9, 10 and 11 three forms of roll apparatus similar to the apparatus shown in Figs. 2 and 3 for thus progressively bending the flange portions, by three distinct steps, though the number of steps may be varied, as desired.

The rolls of Fig. 9 and represented at 38 and 39 and which are the first ones through which the channel piling section would be passed are so peripherally grooved as shown that the flange portion 32, shown by dotted lines in original condition, is bent back at its juncture with the web 31 toward straightened condition throughout about 35°; the rolls of Fig. 10 which are the ones through which the piling section deformed by the rolls 38 and 39 would be passed, are represented at 40 and 41 and are so peripherally grooved that this flange portion is further bent from the position to which it was bent in the rolls of Fig. 9 and as shown by dotted lines in Fig. 10, throughout about 35° as shown by full lines in this figure; and the rolls of Fig. 11, which are the ones through which the piling section deformed by the rolls 40 and 41 would be passed are represented at 42 and 43 and are so peripherally grooved that this flange portion is still further bent from the dotted position shown therein throughout about 35° to the final full line position therein shown, the grooves of the rolls of these various stands being of such form, as shown that no deformation of the locking portions of the sections or change of position thereof relative to the flange portions 32 and 33, occurs in the bending operations referred to.

It will be noted that in the roll apparatus of Figs. 9, 10 and 11 the other flange portion 33 is shown as bent toward straightened condition from the dotted position of Fig. 9 to the full line position therein and then by progressive stages back to the final position it is to occupy by dotted lines in Fig. 9 and by full lines in Fig. 11. The shaping of the rolls to thus bend the flange portion 33 is not, in the particular instance shown, for the purpose of obtaining a conditioning of the finished section but merely to cause a resistance to be afforded by the flange portion 33 to the action of the rolls in operating on the flange portion 32 to insure the proper bending of this last-referred-to flange portion, it being understood that the portions of the rolls of these various stands and into which the locking portions on the flange portion 33 extend are so shaped as shown that these locking portions are not deformed in the bending operation nor are their positions relative to the flange portion 34 changed in this operation.

It will of course be understood that the rolls of the various stands of forming rolls will be so shaped that the flange portions 32 and 33 will extend, in the finished general Z-shaped section, at any desired angle relative to the web and regardless of the particular position occupied by these flange portions relative to the web in the rolled section, such as the section of Fig. 1, presented to the bending or forming rolls for deformation into a general Z-shape section, Figs. 12 and 13 representing two such sections differing from each other only in the matter of the angle at which the flange portions 32 and 33 extend relative to the web.

The piling section of general Z-shape produced as stated is of such form as shown that all of the locking portions in the flange portions 32 and 33 extend generally in the same direction, thus adapting a plurality of these Z-sections to be so assembled that the locking portions extend alternately substantially at the front and rear surfaces, respectively, of the wall formed thereof as shown in Fig. 12 and which is of a strength greatly in excess of a wall built of the channel sections of Fig. 6, or so assembled that the locking portions extend in a line between the front and rear surfaces of the wall as shown in Fig. 13 thus forming a corrugated wall which, while much weaker than a wall formed of Z-sections as in Fig. 12, is of a desirable form where great strength is not required, and the maximum "coverage" is desired, the weight per lineal foot of such a wall being much less in this arrangement than in the case of the arrangement in Fig. 12 and thus of less expensive construction.

As will be noted from Fig. 12, the use of the Z-sections permits, in the combining therewith of a relatively wide and shallow channel section produced in accordance with my invention and having its side walls diverging at approximately a right angle, of the forming of a wall comprising wall portions, each comprising a plurality of the Z-sections, and disposed at a right angle to each other, with a corner section comprising the channel section.

While I have described certain procedures in the practicing of my improved method and have shown certain embodiments of my invention, I do not wish to be understood as intending to limit it thereto as the same may be variously modified and altered without departing from the spirit of my invention.

What I claim as new, and desire to secure by Letters Patent, is:

1. The method of making a piling section of general Z-shape in cross section and formed of a web and flange portions extending therefrom in opposite directions with locking portions at the outer edges of said flange portions, which consists in producing, by a rolling operation, a channel section with said locking portions extending therefrom in opposite directions and thereafter, by a bending operation, causing said flange portions to extend in opposite directions from said web.

2. The method of making a piling section of general Z-shape in cross section and formed of a web and flange portions extending therefrom in opposite directions with locking portions at the outer edges of said flange portions, which consists in producing, by a rolling operation, a channel section with said locking portions extending therefrom in opposite directions and thereafter bending one of said flange portions adjacent its juncture with said web to extend in a direction opposite to that in which the other of said flange portions extends.

WALLACE W. SMITH.